(12) United States Patent
O'Mahony

(10) Patent No.: US 6,570,911 B1
(45) Date of Patent: *May 27, 2003

(54) METHOD AND APPARATUS FOR CONTROLLING MODEM DATA PUMP PARAMETERS BASED ON PROCESSOR LOADING

(75) Inventor: Barry A. O'Mahony, Banks, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,458

(22) Filed: Jun. 27, 1997

(51) Int. Cl.[7] ................................................. H04B 1/38
(52) U.S. Cl. ......................... 375/222; 375/219; 455/73; 710/1
(58) Field of Search .............................. 375/222, 7, 8, 375/219, 257, 295, 316; 709/102, 103, 104, 105; 702/182, 186; 714/47; 455/557, 73; 710/1

(56) References Cited

U.S. PATENT DOCUMENTS

| 4,965,641 | A | * | 10/1990 | Blackwell et al. ............. 375/7 |
| 4,991,184 | A | * | 2/1991 | Hashimoto ...................... 375/8 |
| 5,463,775 | A | * | 10/1995 | DeWitt et al. ............... 702/186 |
| 5,664,095 | A | * | 9/1997 | Cox et al. ...................... 714/47 |
| 5,790,781 | A | * | 8/1998 | Cox et al. ............... 395/184.01 |
| 5,799,064 | A | * | 8/1998 | Sridhar et al. ................ 379/98 |
| 5,864,714 | A | * | 1/1999 | Tal et al. ...................... 395/876 |
| 5,909,384 | A | * | 6/1999 | Tal et al. ................ 364/724.19 |
| 5,920,689 | A | * | 7/1999 | Berry et al. ............ 395/184.01 |
| 5,925,114 | A | * | 7/1999 | Hoang ........................... 710/48 |
| 5,982,814 | A | * | 11/1999 | Yeh et al. .................... 375/222 |
| 5,995,540 | A | * | 11/1999 | Draganic ..................... 375/222 |
| 6,073,030 | A | * | 6/2000 | Nair et al. ................... 455/557 |

OTHER PUBLICATIONS

ITU–T Recommendation V.34 (09/94) of the International Telecommunication Union, A Modem Operating At Data Signalling Rates Of Up To 28 800 bit/s For Use On The General Switched Telephone Network And On Leased Point–to–Point 2–Wire Telephone–Type Circuits.*

Software Modems: A New Way to Communicate, Lee Goldberg, IEEE Computer, Jun. 1997, p. 20.*

Reducing System Cost With Software Modems, Dave Walsh, IEEE Micro, vol. 174, Jul./Aug. 1997, pp. 37–43.*

* cited by examiner

Primary Examiner—Stephen Chin
Assistant Examiner—Chieh M. Fan
(74) Attorney, Agent, or Firm—Blakely, Sokoloff, Taylor & Zafman LLP

(57) ABSTRACT

A method and apparatus control modem data pump parameters based on processor loading. A first set of modem data pump parameters is generated based on characteristics of a telephone line to achieve a first data reception bit-rate in a modem data pump. A change in work-load of a processor used to implement the modem data pump is detected. A second set of modem data pump parameters is then generated in response to the change in processor work-load to achieve a second data reception bit-rate in the modem data pump.

26 Claims, 4 Drawing Sheets

METHOD AND APPARATUS FOR CONTROLLING MODEM DATA PUMP PARAMETERS BASED ON PROCESSOR LOADING

FIELD OF THE INVENTION

The present invention relates to the field of signal processing. More particularly, this invention relates to a method and apparatus for controlling signal processing parameters in a processor-implemented modem data pump.

BACKGROUND OF THE INVENTION

Modems are used by computers to transmit and receive data via telephone lines. Unfortunately, the data rate that can be achieved via telephone line is relatively low and often becomes a performance-limiting bottleneck. For this reason, modern modems commonly perform sophisticated telephone line compensation and data encoding functions in order to maximize data transmission and reception rates across a given telephone line.

The portion of a modem that actually generates outgoing analog waveforms and interprets incoming analog waveforms is called a modem "data pump". While some modems include an additional processing unit to carry out high-level error correction and data compression algorithms, the modem data pump is the unit primarily responsible for compensating telephone line impairments and performing low-level signal encoding and decoding.

Prior-art modem data pumps commonly include a processor, such as a digital signal processor (DSP), a non-volatile storage device to hold a modem data pump program, and an operating memory to hold intermediate computational results. The operating memory is also used to hold modem data pump parameters that specify, for example, data transmission and reception rates, line compensation values and signal encoding/decoding schemes.

A number of modem data pump parameters significantly affect the work-load of the processor used to implement the modem data pump. The symbol rate parameter, for example, specifies the number of symbols the modem data pump is to transmit and receive per second. Because signal reception involves sampling the incoming analog signal at least twice the symbol rate, the sampling rate of the modem data pump and therefore the loading of the modem data pump processor increases in proportion to the symbol rate parameter. Because the modem data pump processor has a finite instruction execution bandwidth (processor bandwidth is often specified in terms of millions of instructions per second (MIPS)), the symbol rate may not be increased beyond the processor's capacity. However, the symbol rate is usually constrained by telephone line bandwidth and not processor capacity.

The carrier frequency determines the frequency of the carrier that is generated by the modem data pump and also places varying demands on processor bandwidth. The sampling rate of the modem data pump also increases as the carrier frequency increases.

The equalizer length is another parameter that affects modem data pump processor loading. The equalizer length indicates the amount of signal processing required to compensate an incoming signal for frequency response deficiency in the telephone line. A longer equalizer length requires more signal processing than a shorter equalizer length and therefore consumes more processor bandwidth.

The equalizer length is determined in an operation called a "modem training sequence" that occurs when a connection between two modems is first established. In a modem training sequence, each modem outputs a signal having agreed upon characteristics. These signals are detected at the respective receivers of the modems and are used by each modem to model the frequency response of the telephone line. Based on the telephone line model, a maximum symbol rate will be selected and an equalizer length is determined. Generally, higher symbol rates require longer equalizers.

Another parameter that affects modem data pump processor loading is a parameter that specifies the length of an echo canceler. An echo canceler subtracts a signal that is subtracted from the received signal to compensate for reflections of the transmitted signal. During the modem training sequence, each modem detects the reflection, if any, of signals that it transmits. The reflection, or echo, is transient and can be compensated for in the receiver by processing the incoming signal to cancel the echo from the transmitter. The echo canceler is typically specified as having a temporal length which corresponds to the duration of the echo. The longer and more resolute the echo canceler, the greater the amount of processor MIPS consumed.

Precoding is another signal processing technique used to increase transmission bit-rate, but which consumes processor MIPS. Precoding is a technique for introducing inter-symbol interference (ISI) in a controlled way so that it can be canceled by receiver logic. When precoding is enabled, processor bandwidth must be consumed to generate the ISI cancellation signal and process the signal in the receiver.

Trellis coding is yet another signal processing technique used to increase transmission bit-rate at the expense of processor bandwidth. When trellis coding is enabled, redundant points in a multi-symbol quadrature amplitude modulation (QAM) constellation are used to perform forward error correction. In essence, redundant points are encoded in a particular sequence that can be detected by the receiver and used to confirm signal integrity.

In prior-art modem data pump implementations, the modem data pump parameters are selected to maximize data transmission and reception rates based on telephone line quality. Processor bandwidth is used to the full extent necessary to perform the processing indicated by the modem data pump parameters.

In modems having a data pump processor dedicated to performing data pump operations, selecting data pump parameters to achieve a maximum possible data rate is usually acceptable. However, the modern trend is to have the computer's host processor perform modem data pump processing instead of using a dedicated modem data pump processor. When the host processor performs data pump processing, the modem is referred to as a "soft modem", and the host processor is typically multitasked between performing modem data pump functions and other tasks.

The prior art technique of selecting data pump parameters to achieve maximum data rate can adversely affect system performance whenever the processor which implements the modem data pump is assigned multiple processing tasks. Depending on the bandwidth of the processor and the number of tasks the processor is required to concurrently execute, there may not be enough processor bandwidth to adequately perform all tasks if too much processor bandwidth is consumed implementing the modem data pump.

SUMMARY OF THE INVENTION

A method and apparatus for controlling modem data pump parameters based on processor loading is disclosed. A first set of modem data pump parameters is generated based on characteristics of a telephone line and used to achieve a first data reception bit-rate in a modem data pump. A change in work-load is detected for a processor used to implement the modem data pump. A second set of modem data pump parameters is generated in response to the change in workload of the processor used to implement the modem data pump, and a second data reception bit-rate is achieved in the modem data pump using the second set of modem data pump parameters.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to the present invention, modem data pump parameters are determined based not only on telephone line characteristics, but also on the dynamic loading of the processor used to implement the modem data pump.

Figure 1:
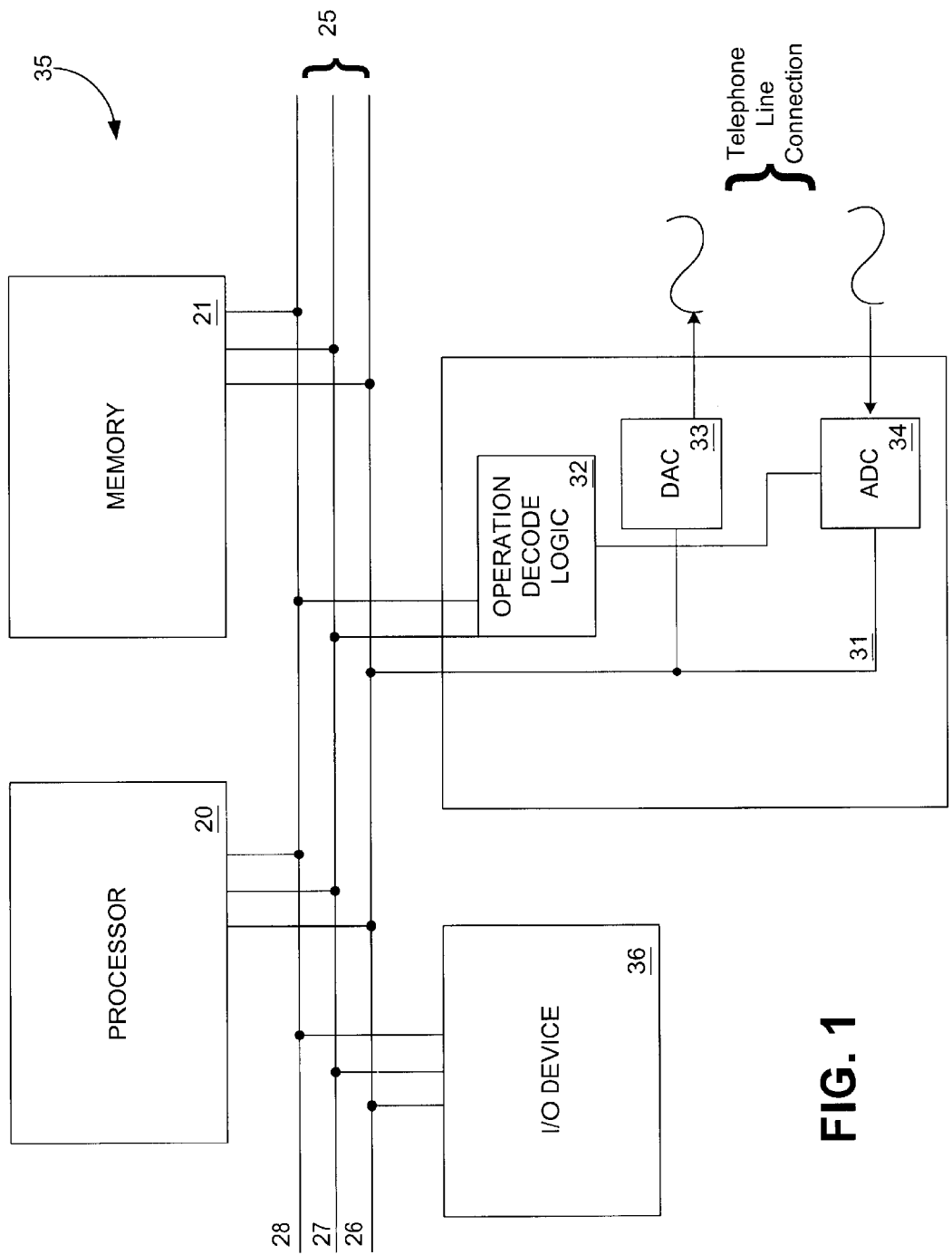
FIG. 1 is a circuit diagram of a modem data pump.

FIG. 1 is circuit diagram of a modem data pump 35 according to one embodiment of the present invention. Modem data pump 35 includes processor 20, memory 21, analog interface unit 31 and I/O device 36, all interconnected via bus 25.

In a soft modem implementation, processor 20 would typically be a host processor such as an Intel™ microprocessor that can be used to execute a variety of application programs in addition to performing modem data pump processing. In an alternate implementation of the present invention, processor 20 may be a digital signal processor (DSP) that performs other processing tasks (e.g., digital simultaneous voice and data functions (DSVD)) in addition to modem data pump processing.

According to one embodiment of the present invention, bus 25 includes data bus 26, address bus 27 and control bus 28. When processor 20 attempts to write to memory 21 or to analog interface unit 31, processor 20 asserts (i) one or more control signals on control bus 28 indicating the write operation, (ii) an address on address bus 27 indicating the target of the write operation and (iii) the data to be written on data bus 26. Similarly, when processor 20 attempts to read from memory 21 or from analog interface unit 31, processor 20 (i) asserts one or more control signals on control bus 28 indicating the read operation, (ii) asserts an address on address bus 27 indicating the target of the read operation and (iii) obtains the data output by the target device via data bus 26.

According to one embodiment of the present invention, memory 21 includes a non-volatile memory used to store a boot program for processor 20, a mass storage unit used to hold an operating system and application programs to be executed by processor 20 and an operating memory, typically random-access memory (RAM), into which operating system program code and application program code are loaded for execution. The operating memory is typically made up of semiconductor random-access memory (RAM) and is also used to store values indicating certain program parameters, including modem data pump parameters.

Analog interface unit 31 is a signal conversion circuit that includes operation decode logic 32, digital-to-analog converter (DAC) 33, and analog-to-digital digtial converter (ADC) 34. DAC 33 and ADC 34 are typically coupled to the respective terminals of a local telephone loop to allow transmission and reception of analog signals on the local loop. Operation decode logic 32 is coupled to address bus 27 and control bus 28 and controls access to DAC 33 and ADC 34. For example, when processor 20 asserts an address on address bus 27 that corresponds to analog interface unit 31 and also asserts a signal on control bus 28 indicating a write operation, operation decode logic 32-enables DAC 33 to sample data present on data bus 26 and convert it to an analog signal. Similarly, when processor 20 asserts an address on address bus 27 that corresponds to analog interface unit 31 and also asserts a control bus 28 signal indicating a read operation, operation decode logic 32 enables ADC 34 to present a digital value on data bus 26 that represents an analog signal received from the telephone line and converted to digital form by ADC 34. Depending on implementation, ADC 34 may convert incoming analog data in response to read requests by processor 20 or may convert incoming analog data in response to another stimulus such as a clock circuit included in analog interface unit 31.

Figure 2:
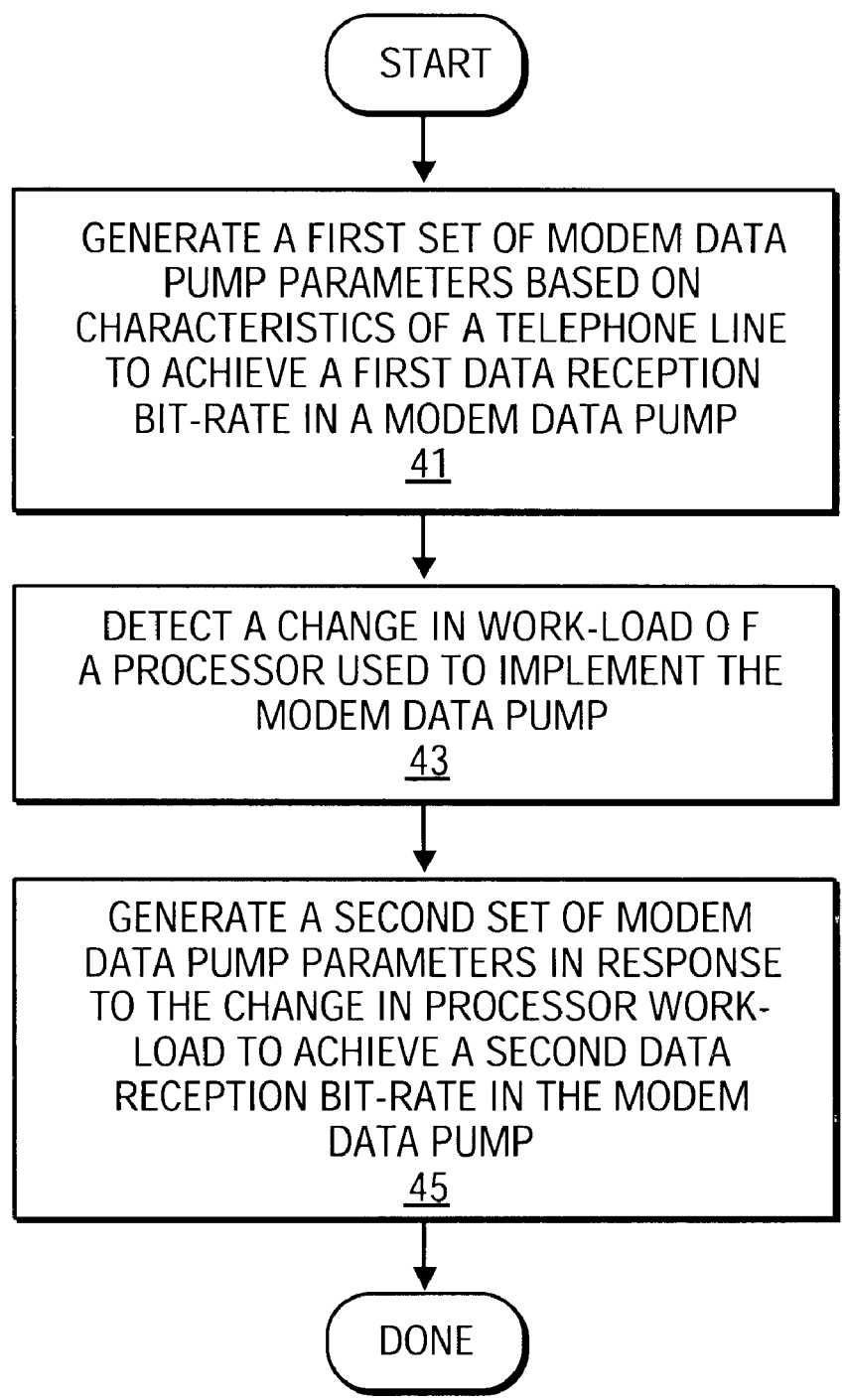
FIG. 2 is a flow diagram according to one embodiment of the present invention.

FIG. 2 is a flow diagram according to one embodiment of the present invention. At step 41, a first set of modem data pump parameters is generated based on characteristics of a telephone line. This is accomplished, for example, by executing a modem training sequence to determine a maximum symbol rate, a carrier frequency, an equalizer length, an echo canceler length, whether to enable precoding and whether to enable trellis encoding. The above list of parameters is not intended to be exhaustive and other modem data pump parameters may also be determined during step 41. Based on the first set of modem data pump parameters, a first data bit-rate is achieved in the modem data pump.

At step 43, a change in the work-load of the processor used to implement the modem data pump is detected. This may be accomplished in a number of ways. For example, the change in processor work-load may be detected based on the termination or initiation of an application program in another process (as an aside, the term process is used herein to mean any instance of computer program execution, including processes and threads). Alternatively, a change in processor loading can be detected by empirical measurement of the time required to perform a benchmarked sequence of instructions. Each of these techniques for detecting change in processor work-load are discussed further below in reference to FIG. 3 and FIG. 4.

After a change in processor loading is detected at step 43, a second set of modem data pump parameters is generated to achieve a second data reception bit-rate at step 45. According to one embodiment of the present invention if the increase in processor loading detected at step 43 indicates that the processor is overloaded (e.g., more than 100% loaded), modem data pump parameters are selected to reduce the processor bandwidth consumed by the modem data pump task so that additional processor bandwidth is available for other functions. Later if reduced processor loading is detected, yet another set of modem data pump parameters may be selected to achieve higher data bit-rate. This way, modem data pump processing is dynamically scaled according to processor loading to optimize overall system performance.

According to one embodiment of the present invention, the second set of modem data pump parameters is generated by executing a second modem training sequence (the first modem training sequence having been executed to establish the first set of parameters in step 41). If processor loading has increased, the second modem training sequence, or "modem retrain" procedure is used to select, for example, a reduced symbol rate, carrier frequency, equalizer length, echo canceler length, or some combination thereof. Also, precoding and trellis encoding/decoding may be disabled or performed using a less MIPS-intensive algorithm to further reduce processor bandwidth consumed by data pump processing.

It should be noted that unlike many other types of signal processing applications, modem data pump processing must occur in real-time. Further, it is generally not acceptable for the modem data pump to lose data. This is in contrast to, for example, video processing applications where it is usually permissible for a recipient device to drop video frames if the recipient device is unable to keep pace with the transmitting device. Thus, when the modem retrain procedure is performed, both the transmitter and receiver are reconfigured to operate using the new modem data pump parameters.

Figure 3:
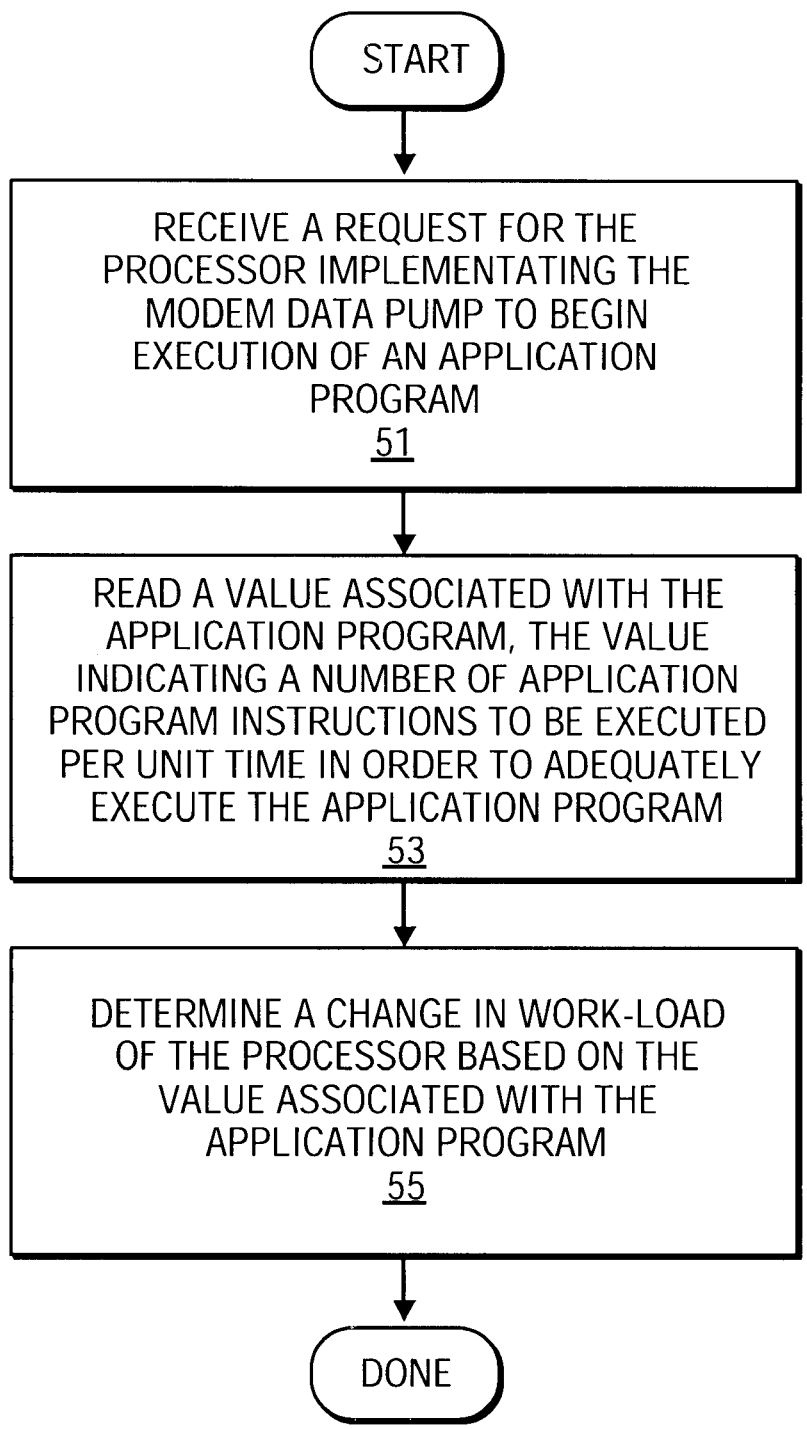
FIG. 3 is a flow diagram illustrating one technique for detecting a change in loading of a processor used to implement a modem data pump.

FIG. 3 is a flow diagram illustrating one technique for detecting a change in loading of the processor used to implement the modem data pump. At step 51, a request for the processor to begin execution of an application program other than the modem data pump code is received. For the purpose of the present invention, the application program may be any sequence of instructions that can be executed, or interpreted for execution, by the processor. At step 53, a predetermined benchmark value indicating a measure of processor loading required to execute the application program is read. The benchmark value may be stored with program code, program data or in a database of benchmark values associated with respective application programs. Generally, the benchmark value associated with the application program may be any value that can be used to determine a change in processor loading that will result from execution or termination of the application program. For example, according to one embodiment of the present invention, the benchmark value specifies the number of instructions that must be executed per unit time to achieve a given level of application program performance. The level of application program performance to be achieved may range between ideal performance and minimum tolerable performance, and the benchmark value may be specified in any unit of instruction execution rate, such as MIPS or weighted mega-operations (i.e., weighted MOPs, a standardized measure of instruction execution rate).

Another way that change in processor loading can be detected is by empirical measurement. Many computers include hardware timing circuits that can be read to determine elapsed time. By reading the hardware timing circuit periodically, for example at the beginning and end of a well-behaved sequence of instructions. A stop-watch-like measurement can be made of the time required for the processor to execute the sequence of instructions. This measurement can be compared against a benchmark time required for the processor to execute the instructions without interruption. The extent to which the measurement differs from the benchmark time can then be used as a relative measure of processor loading. The benchmark time can be established by measuring the time required to execute the sequence of instructions when the processor is not multi-tasking; at system start-up, for example. Later, when the processor is multi-tasking, execution of the sequence of instructions will take longer by virtue of the time-multiplexed execution of the various tasks. Consequently, if execution of the sequence of instructions takes twice as long, for example, as the benchmark time, the processor may be considered to be approximately twice as heavily loaded as when not multi-tasking. By establishing an outside limit on the amount of time required to execute the benchmarked sequence of instructions and considering that outside limit to represent 100% processor loading, measurement of the time required to execute the benchmarked sequence of instructions can be converted to a percentage of processor loading. Changes in processor loading percentage can then be determined from measurement to measurement.

Figure 4:
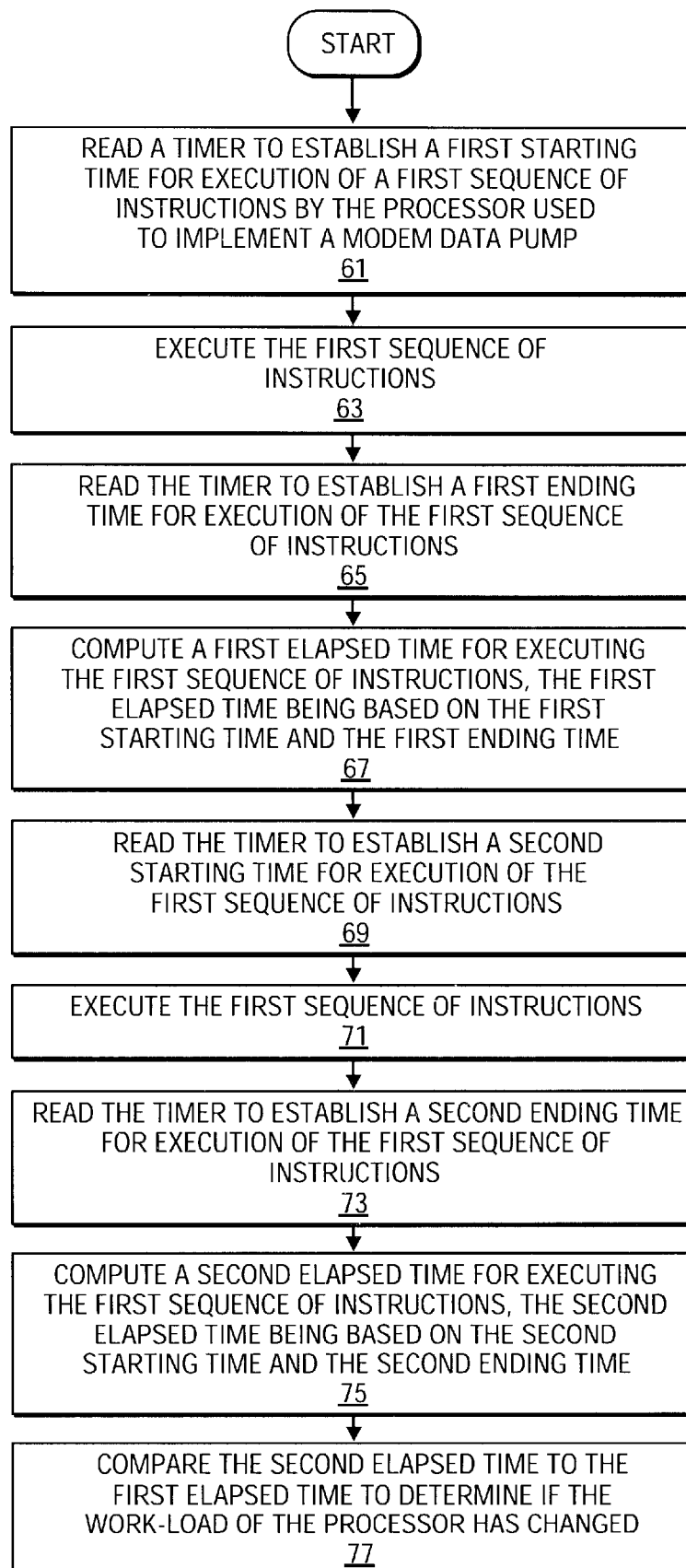
FIG. 4 is a flow diagram illustrating another technique for detecting a change in loading of a processor used to implement a modem data pump.

FIG. 4 is a flow diagram according to an embodiment of the present invention that makes use of empirical measurement to detect changes in work-load of the processor used to implement the modem data pump. At step 61, a timer is read to establish a first starting time for execution of a first sequence of instructions by the processor used to implement the modem data pump. The timer will generally be a processor addressable hardware timing circuit (e.g., an up or down counter) resident in the computer including the modem data pump processor, but may alternatively be an external timing source. For example, a timer generated by sampling an analog signal (e.g., a 60 Hz waveform) or by accessing a clock via a computer network connection would be within the spirit and scope of the present invention. At step 63, the first sequence of instructions is executed. The first sequence of instructions may be executed in its own process, or may be executed as part of another process, including the process in which the modem data pump is implemented. At step 65, the timer is read again to establish a first ending time for execution of the first sequence of instructions, then the first ending time and the first starting time are used in step 67 to compute a first elapsed time for executing the first sequence of instructions.

Steps 69, 71, 73 and 75 are identical to steps 61, 63, 65 and 67, except that second starting and ending times are read and used to compute a second elapsed time for execution of the first sequence of instructions. Then, at step 77, the first and second elapsed times are compared to determine if the work-load of the processor used to implement the modem data pump has changed.

Having described alternate techniques for detecting changes in loading of a processor used to implement a modem data pump, it will be appreciated that yet other techniques may be used to detect changes in processor loading. Any technique that can be used to detect change in work-load of a processor used to implement a modem data pump is considered within the spirit and scope of the present invention.

As mentioned above, modem data pump 35 of FIG. 1 includes an I/O device 36. In the case where modem data pump 35 is a soft modem, processor 20, memory 21 and bus 25 may be used to perform the functions of a general purpose computer. In that case, I/O device, 36 may be any collection of processor addressable devices necessary to achieve a particular computer configuration. For example, I/O device may be a keyboard, cursor control device (e.g., a mouse or trackball), display apparatus, sound generation unit, et cetera.

Recall that memory 21 of FIG. 1 typically includes non-volatile boot program storage, mass storage unit and operating memory. The mass storage unit may be an optical disk and drive (e.g., compact disk read-only-memory), a magnetic storage medium and drive (e.g., hard drive, floppy drive, zip drive, tape drive, etc.), or any other device that allows processor 20 to read data and program code from a computer-readable media. The present invention may be in a sequence of instructions that can be stored in a computer-readable medium and executed by processor 20.

Having described a number of methods for practicing the present invention, it should be noted that the individual steps therein may be performed by a general purpose processor programmed with instructions that cause the processor to perform the recited steps, specific hardware components that contain hard-wired logic for performing the recited steps, or any combination of programmed general purpose computer components and custom hardware components. For example, in one embodiment of the present invention a parameter generator implemented by either hard-wired logic or a programmed processor may be used to generate modem data pump parameters, and a work-load detector implemented by either hard-wired logic or a programmed processor may be used to detect changes in work-load of the processor used to implement the modem data pump. Nothing disclosed herein should be construed as limiting the present invention to a single embodiment wherein the recited steps are performed by a specific combination of hardware components.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising:
   generating a first set of modem data pump parameters based on characteristics of a telephone line to achieve a first data reception bit-rate in modem data pump;
   detecting a change in work-load of a processor used to implement the modem data pump by detecting a change in a length of time required for the processor to execute a sequence of predetermined instructions; and
   generating a second set of modem data pump parameters in response to the change in processor work-load to achieve a second data reception bit-rate in the modem data pump.

2. The method of claim 1 wherein generating a first set of modem data pump parameters and generating a second set of modem data pump parameters both comprise generating a symbol-rate parameter indicating a rate of symbol reception.

3. The method of claim 1 wherein generating a first set of modem data pump parameters and generating a second set of modem data pump parameters both comprise generating a line equalizer parameter including a plurality of data values used to compensate for frequency response deficiency in the telephone line.

4. The method of claim 1 wherein generating a first modem data pump parameters and generating a second set of modem data pump parameters both comprise generating an echo cancellation parameter including a plurality of data values used to compensate for reflection of a signal transmitted on the telephone line.

5. The method of claim 1 wherein generating a first set of modem data pump parameters and generating a second set of modem data pump parameters both comprise generating a coding parameter indicating a decoding scheme for receiving a quadrature amplitude modulated (QAM) data signal.

6. The method of claim 1 wherein detecting a change in work-load of a processor comprises detecting an increase in workload of the processor, and wherein generating a second set of modem data pump parameters comprises generating a second set of modem data pump parameters to achieve a data reception bit-rate that is lower than the first data reception rate.

7. The method of claim 6 wherein generating a second set of modem data pump parameters to achieve a data reception bit rate that is lower than the first data reception bit rate comprises generating the second set of modem data pump parameters to achieve a data reception bit rate that can be accommodated by a reduced number of instructions executed by the processor per unit time.

8. The method of claim 7 wherein the reduced number of instructions executed by the processor per unit time corresponds to a number of instructions per unit time required to be executed by the processor to accommodate the increase in workload.

9. The method of claim 1 wherein detecting a change in work-load of a processor comprises:
   measuring a first time required for the processor to execute the sequence of predetermined instructions;
   measuring a second time required for the processor to execute the sequence of predetermined instructions; and
   comparing the first time with the second time.

10. The method of claim 9 wherein generating a second set of modem data pump parameters comprises generating the second set of modem data pump parameters to achieve a data reception bit rate that can be accommodated by a reduced number of instructions executed by the processor per unit time, the reduced number of instructions executed by the processor per unit time being based on a difference between the first time and the second time.

11. A method comprising:
   generating a first set of modem data pump parameters based on characteristics of a telephone line to achieve a first data reception bit-rate in modem data pump;
   detecting a change in work-load of a processor used to implement the modem data pump by detecting a request to begin execution of first program code other than program code executed by the processor to implement the modem data pump;
   generating a second set of modem data pump parameters in response to the change in processor work-load to achieve a second data reception bit-rate in the modem data pump; and
   determining the number of instructions per unit time required to be executed by the processor to execute the first program code based on a predetermined value associated with the first program code.

12. The method of claim 11 wherein generating a second set of modem data pump parameters comprises generating the second set of modem data pump parameters to achieve a data reception bit rate that can be accommodated by a reduced number of instructions executed by the processor per unit time, the reduced number of instructions executed by the processor per unit time required to be executed by the processor to execute the first program code.

13. The method of claim 11 wherein generating a second set of modem data pump parameters comprises executing a modem retrain procedure.

14. An apparatus comprising:
    means for generating a first set of modem data pump parameters based on characteristics of a telephone line to achieve a first data reception bit-rate in a modem data pump;
    means for detecting a change in work-load of a processor used to implement the modem data pump by detecting a change in a length of time required for the processor to execute a sequence of predetermined instructions; and
    means for generating a second set of modem data pump parameters in response to the change in processor work-load to achieve a second data reception bit-rate in the modem data pump.

15. The apparatus of claim 14 wherein said means for detecting a change in work-load of a processor comprises:
    means for measuring a first time required for the processor to complete a sequence of benchmark instructions;
    means for measuring a second time required for the processor to complete the sequence of benchmark instructions; and
    means for comparing the first time and the second time.

16. An apparatus comprising:
    a parameter generator to generate a first set of modem data pump parameters based on characteristics of a telephone line to achieve a first data reception bit rate in a modem data pump; and
    a work-load detector to detect a change in work-load of a processor used to implement the modem data pump by detecting a change in a length of time required for the processor to execute a sequence of predetermined instructions;
    said parameter generator to generate a second set of modem data pump parameters in response to the change in processor work-load to achieve a second data reception bit-rate in the modem data pump.

17. The apparatus of claim 16 wherein at least one of said parameter generator and said work-load detector is implemented by a programmed processor.

18. A modem data pump comprising:
    a processor;
    an analog interface unit coupled to said processor, said analog interface unit to connect to a telephone line, said analog interface unit including a first conversion circuit to convert a sequence of digital values received from said processor to a sequence of analog voltages and to assert the sequence of analog voltages on said telephone line, said analog interface unit further including a second conversion circuit to convert a sequence of analog voltages sampled on said telephone line to a sequence of digital values to be read by said processor;
    a memory coupled to said processor, said memory including first program code which, when executed by said processor, causes said processor to:
        generate a first set of modem data pump parameters based on characteristics of the telephone line to achieve a first data reception bit-rate in said modem data pump;
        detect a change in work-load of said processor by detecting a change in a length of time required for the processor to execute a predetermined sequence of instructions; and
        generate a second set of modem data pump parameters in response to the change in processor work-load to achieve a second data reception bit-rate in said modem data pump.

19. A computer-readable medium having instructions stored thereon which, when executed by a processor, cause said processor to:
    generate a first set of modem data pump parameters based on characteristics of a telephone line to achieve a first data reception bit-rate in a modem data pump, the modem data pump including said processor;
    detect a change in work-load of said processor by detecting a change in a length of time required for the processor to execute a sequence of predetermined instructions; and
    generate a second set of modem data pump parameters in response to the change in processor work-load to achieve a second data reception bit-rate in the modem data pump.

20. The computer-readable medium of claim 19, wherein the instructions that, when executed, cause the processor to detect a change in work-load of said processor comprises instructions that, when executed by the processor, cause the processor to:
    measure a first time required for said processor to execute the sequence of predetermined instructions;
    measure a second time required for said processor to execute an other sequence of predetermined instructions; and
    compare the first time and the second time.

21. The computer-readable medium of claim 20 wherein the sequence of predetermined instructions is the same as the other sequence of predetermined instructions.

22. A computer-readable medium having a first sequence of instructions stored thereon which, when executed by a processor, causes said processor to:
    generate a first set of modem data pump parameters based on characteristics of a telephone line to achieve a first data reception bit-rate in modem data pump;
    detect a change in work-load of the processor used to implement the modem data pump by detecting a request to begin execution of first program code other than program code executed by the processor to implement the modem data pump;
    generate a second set of modem data pump parameters in response to the change in processor work-load to achieve a second data reception bit-rate in the modem data pump; and
    determine the number of instructions per unit time required to be executed by the processor to execute the first program code based on a predetermined value associated with the first program code.

23. The computer-readable medium of claim 22, wherein the first sequence of instructions stored thereon which, when executed by the processor, cause the processor to generate the first and the second set of modem data pump parameters further comprises instructions, that when executed by the processor, cause the processor to generate a first and a second symbol-rate parameter indicating a rate of symbol reception.

24. The computer-readable medium of claim 22, wherein the first sequence of instructions stored thereon which, when executed by the processor, cause the processor to detect a change in the length of time required for the processor to execute a sequence of predetermined instructions further comprises instructions, that when executed by the processor, cause the processor to
    measure a first time required for the processor to execute the sequence of predetermined instructions;

measure a second time required for the processor to execute the sequence of predetermined instructions; and compare the first time and the second time.

25. The computer-readable medium of claim 22, wherein the first sequence of instructions stored thereon which, when executed by the processor to generate a second set of modem data parameters, further comprises instructions, that when executed by the processor, cause the processor to achieve a data reception bit-rate that is lower than the first data reception bit-rate.

26. The computer-readable medium of claim 22, wherein the first sequence of instructions stored thereon which, when executed by the processor, cause the processor to generate a second set of modem data pump parameters further comprises instructions, that when executed by the processor cause the processor to execute a modem retrain procedure.

* * * * *

UNITED STATES PATENT AND TRADEMARK OFFICE
CERTIFICATE OF CORRECTION

PATENT NO.    : 6,570,911 B1
DATED         : May 27, 2003
INVENTOR(S)   : O'Mahony It is certified that error appears in the above-identified patent and that said Letters Patent is hereby corrected as shown below:

<u>Column 4,</u>
Line 8, after "analog-to-digital", delete "digital".

<u>Column 7,</u>
Line 5, after "may be", insert -- embodied --.

Signed and Sealed this

Sixteenth Day of December, 2003

JAMES E. ROGAN
*Director of the United States Patent and Trademark Office*